US012630010B2

(12) United States Patent　　　　　(10) Patent No.:　　US 12,630,010 B2
Oota　　　　　　　　　　　　　　　　　(45) Date of Patent:　　　May 19, 2026

(54) UNIT WITH HEAT EXCHANGER AND HOUSING ACCOMMODATING DIFFERENTIAL GEAR

(71) Applicant: JATCO Ltd, Fuji City (JP)

(72) Inventor: Yusuke Oota, Ebina (JP)

(73) Assignee: JATCO Ltd, Fuji City (JP)

( * ) Notice: Subject to any disclaimer, the term of this patent is extended or adjusted under 35 U.S.C. 154(b) by 293 days.

(21) Appl. No.: 18/561,415

(22) PCT Filed: May 26, 2022

(86) PCT No.: PCT/JP2022/021494
§ 371 (c)(1),
(2) Date: Nov. 16, 2023

(87) PCT Pub. No.: WO2022/270212
PCT Pub. Date: Dec. 29, 2022

(65) Prior Publication Data
US 2024/0227548 A1　　Jul. 11, 2024

(30) Foreign Application Priority Data

Jun. 24, 2021　(JP) ................................ 2021-105240

(51) Int. Cl.
*B60K 17/16*　　　(2006.01)
*B60K 1/00*　　　(2006.01)
*B60K 11/00*　　　(2006.01)

(52) U.S. Cl.
CPC .............. *B60K 17/16* (2013.01); *B60K 11/00* (2013.01); *B60K 2001/001* (2013.01)

(58) Field of Classification Search
CPC .. B60K 17/16; B60K 2001/001; B60K 11/04; F16H 57/04
See application file for complete search history.

(56) References Cited

U.S. PATENT DOCUMENTS

| | | | | |
|---|---|---|---|---|
| 10,272,767 | B1 * | 4/2019 | Tang ......................... | F01P 5/10 |
| 11,137,061 | B2 * | 10/2021 | Ishikawa ............. | F16H 57/0441 |
| 11,201,523 | B2 * | 12/2021 | Ishikawa ............. | H02K 7/1815 |
| 11,326,687 | B1 * | 5/2022 | Ghatti ................... | B60K 17/08 |
| 2004/0163409 | A1 | 8/2004 | Nakajima et al. | |
| 2008/0182712 | A1 | 7/2008 | Kira et al. | |
| 2019/0162291 | A1 | 5/2019 | Gerges et al. | |
| 2020/0340376 | A1 | 10/2020 | Slesinski et al. | |

FOREIGN PATENT DOCUMENTS

| | | |
|---|---|---|
| JP | 2004-260898 A | 9/2004 |
| JP | 2008-185078 A | 8/2008 |
| JP | 2009-281446 A | 12/2009 |

\* cited by examiner

*Primary Examiner* — Huan Le
(74) *Attorney, Agent, or Firm* — Foley & Lardner LLP

(57)　　　　　ABSTRACT

Provided is a unit including: a heat exchanger; and a housing configured to accommodate a differential gear mechanism, in which the housing has a portion having an inclined surface surrounding the differential gear mechanism in a radial direction, and the heat exchanger has a portion that overlaps the inclined surface when viewed in an axial direction.

7 Claims, 11 Drawing Sheets

UNIT WITH HEAT EXCHANGER AND HOUSING ACCOMMODATING DIFFERENTIAL GEAR

TECHNICAL FIELD

The present invention relates to a unit.

BACKGROUND ART

Patent Document 1 discloses a unit including a motor and a power transmission mechanism.

PRIOR ART DOCUMENT

Patent Document

Patent Document 1: JP 2008-185078 A

SUMMARY OF INVENTION

In a unit, oil is used to lubricate and cool rotating members. A heat exchanger for cooling the oil is mounted on the unit. The heat exchanger cools the oil by exchanging heat between a coolant such as cooling water and the oil.

In the unit in which the heat exchanger is mounted, it is required to provide a structure that contributes to a reduction in dimension in at least one direction.

According to one aspect of the present invention, a unit includes:

a heat exchanger; and a housing configured to accommodate a differential gear mechanism, wherein the housing has a portion having an inclined surface surrounding the differential gear mechanism in a radial direction, and the heat exchanger has a portion that overlaps the inclined surface when viewed in an axial direction.

According to one aspect of the present invention, a unit includes:

a heat exchanger;

a housing configured to accommodate a differential gear mechanism, wherein the differential gear mechanism has a portion that overlaps a motor when viewed in an axial direction, the heat exchanger has a portion that overlaps the housing when viewed in the axial direction, and the heat exchanger is positioned above the differential gear mechanism in a gravity direction.

An aspect of the present invention contributes to a reduction in dimension in at least one direction in a unit equipped with a heat exchanger.

DESCRIPTION OF EMBODIMENTS

Figure 1:
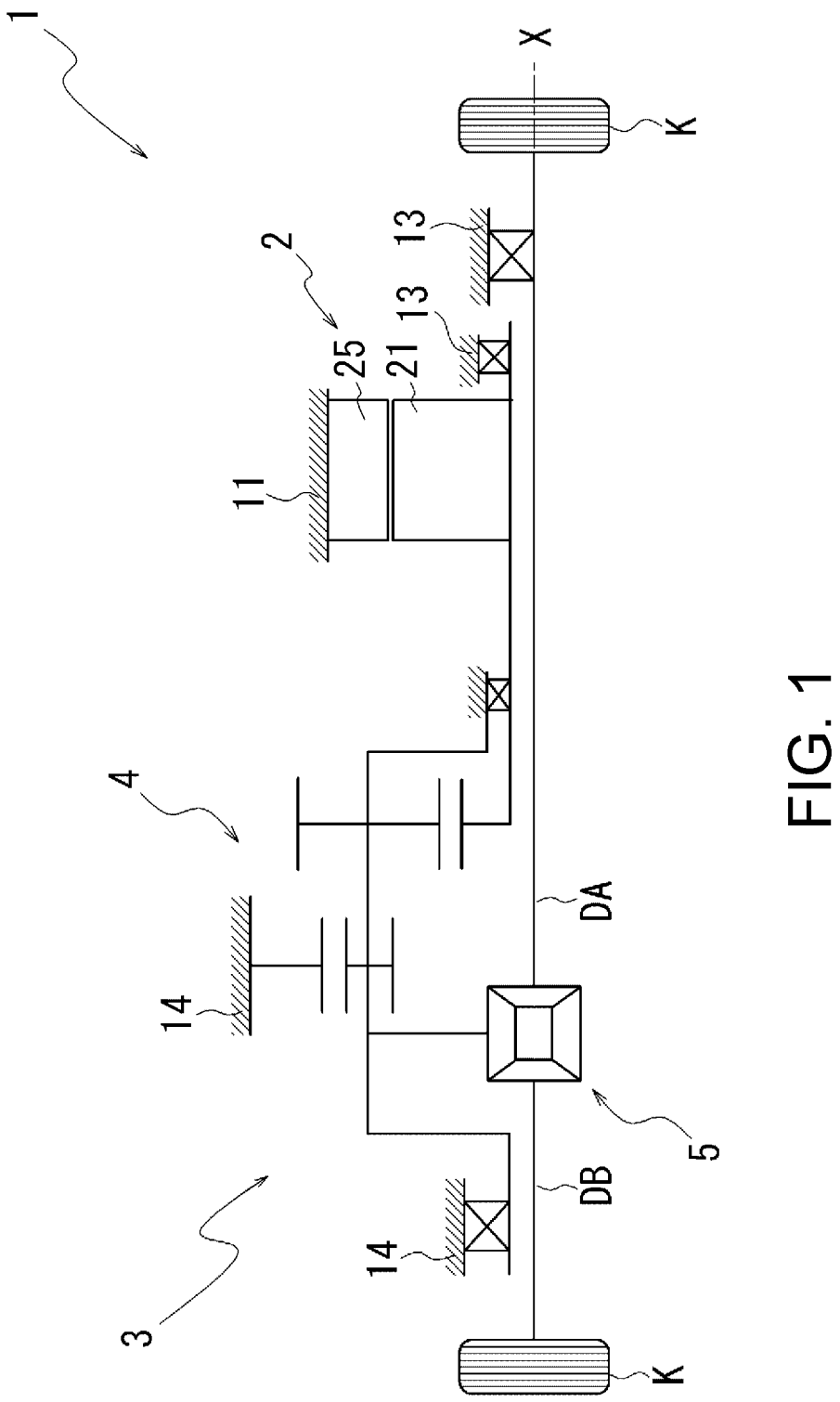
FIG. 1 is a skeleton diagram illustrating a unit mounted on a vehicle.

First, definitions of terms in the present specification will be described.

A "unit" is also referred to as a "motor unit", a "power transmission device", or the like. The motor unit is a unit that includes at least a motor. The power transmission device is a device that includes at least a power transmission mechanism, and is, for example, a gear mechanism and/or a differential gear mechanism. A unit that is a device including a motor and a power transmission mechanism belongs to the concept of both the motor unit and the power transmission device.

A "housing" accommodates a motor, a gear, and an inverter. The housing includes one or more cases.

"3-in-1" means a form in which a part of a motor case accommodating a motor and a part of an inverter case accommodating an inverter are integrally formed. For example, when a cover and a case constitute one case, in "3-in-1", the case accommodating a motor and the case accommodating an inverter are integrally formed.

A "motor" is a rotating electrical machine that has a motor function and/or a generator function.

When referring to a second element (component, portion, or the like) connected to a first element (component, portion, or the like), the second element (component, portion, or the like) connected downstream of the first element (component, portion, or the like), and the second element (component, portion, or the like) connected upstream of the first element (component, portion, or the like), it means that the first element and the second element are connected such that power can be transmitted. A power input side is upstream, and a power output side is downstream. The first element and the second element may be connected to each other via another element (clutch, other gear mechanism, or the like).

The description "overlap when viewed in a predetermined direction" means that a plurality of elements are disposed in a predetermined direction, and has the same meaning as the description "overlap in a predetermined direction". The "predetermined direction" is, for example, an axial direction, a radial direction, a gravity direction, or a vehicle traveling direction (vehicle forward direction, vehicle backward direction).

When the drawing shows that a plurality of elements (components, portions, or the like) are disposed in a predetermined direction, in the description of the specification, it may be considered that there is a sentence explaining that the plurality of elements overlap when viewed in the predetermined direction.

The descriptions "do not overlap when viewed in a predetermined direction" and "are offset when viewed in a predetermined direction" mean that a plurality of elements are not disposed in a predetermined direction, and have the same meaning as the descriptions "do not overlap in a predetermined direction" and "are offset in a predetermined direction". The "predetermined direction" is, for example, an axial direction, a radial direction, a gravity direction, or a vehicle traveling direction (vehicle forward direction, vehicle backward direction).

When the drawing shows that a plurality of elements (components, portions, or the like) are not disposed in a predetermined direction, in the description of the specification, it may be considered that there is a sentence explaining that the plurality of elements do not overlap when viewed in the predetermined direction.

The description "a first element (component, portion, or the like) is positioned between a second element (component, portion, or the like) and a third element (component, portion, or the like) when viewed in a predetermined direction" means that when viewed from the predetermined direction, it can be observed that the first element is between the second element and the third element. The "predetermined direction" is an axial direction, a radial direction, a gravity direction, a vehicle traveling direction (vehicle forward direction, vehicle backward direction), or the like.

For example, when the second element, the first element, and the third element are disposed in this order along the axial direction, it can be said that the first element is positioned between the second element and the third element when viewed in the radial direction. When the drawing shows that the first element is positioned between the second element and the third element when viewed in a predetermined direction, in the description of the specification, it may be considered that there is a sentence explaining that the first element is between the second element and the third element when viewed in the predetermined direction.

In a case where two elements (components, portions, or the like) overlap when viewed in the axial direction, the two elements are coaxial.

The "axial direction" means an axial direction of a rotation axis of a component that constitutes a unit. The "radial direction" means a direction orthogonal to the rotation axis of the component that constitutes a unit. Examples of components include a motor, a gear mechanism, and a differential gear mechanism.

When a rotating element (for example, sun gear, carrier, or ring gear) of a planetary gear mechanism is "fixed" to another element, the rotating element may be directly fixed or may be fixed via another member.

A "downstream side in a rotation direction" means a downstream side in a rotation direction when a vehicle moves forward or in a rotation direction when the vehicle moves backward. It is preferable to regard it as the downstream side in the rotation direction when the vehicle moves forward, which occurs frequently. A downstream side in a rotation direction of the planetary gear mechanism means a downstream side in a revolution direction of a pinion gear.

A "catch tank" is an element (component, portion, or the like) that has a function of a tank (container) into which oil is introduced. The supply of oil from the outside of the tank to the tank is expressed as "catch". The catch tank is provided, for example, using at least a part of the housing, or is provided separately from the housing. The integrated formation of the catch tank and the housing contributes to a reduction in the number of components.

A "coolant" is a refrigerant and is a type of heat exchange medium. For example, the "coolant" is a liquid (cooling water or the like) or a gas (air or the like). The coolant is a concept that includes oil, but when both oil and coolant are described in the present specification, it means that the coolant is made of a material different from that of the oil.

A "heat exchange unit" is an element (component, portion, or the like) that exchanges heat between two different heat exchange media. Combinations of the two heat exchange media are, for example, oil and cooling water, cooling water and air, or air and oil. The heat exchange unit includes, for example, a heat exchanger (oil cooler), a flow path through which a coolant flows, and a heat pipe. In the present invention, it is preferable to use a heat exchanger (oil cooler) as the heat exchange unit. The use of the heat exchanger can contribute to the improvement in the heat exchange efficiency.

The heat exchanger (oil cooler) is a separate component from the housing. In the heat exchanger, for example, heat is exchanged between oil and cooling water.

A "vehicle room" means a room in a vehicle into which passengers enter.

Hereinafter, an embodiment of the present invention will be described.

FIG. 1 is a skeleton diagram illustrating a unit mounted on a vehicle.

Figure 2:
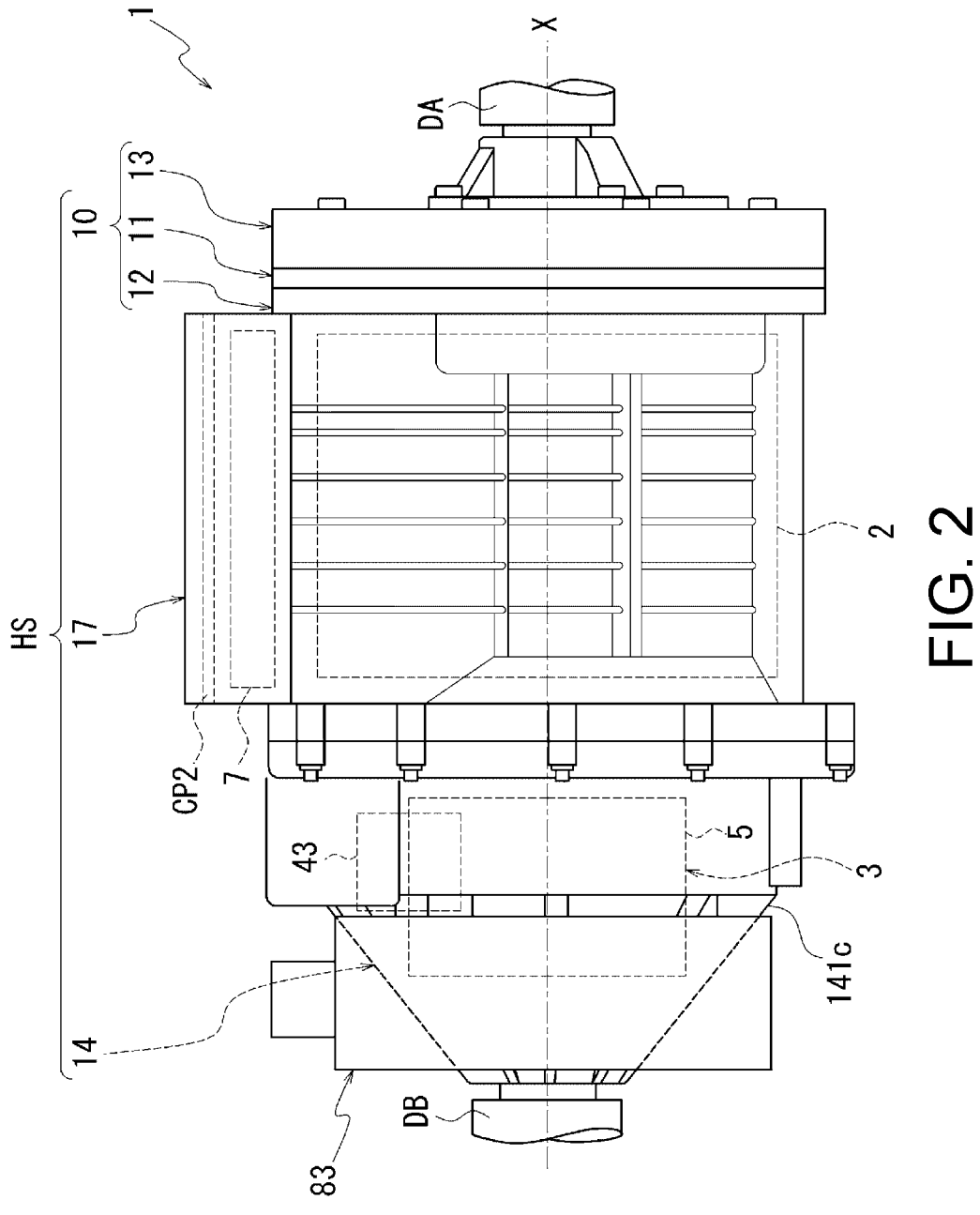
FIG. 2 is an external view of the unit.

FIG. 2 is an external view of the unit.

Figure 3:
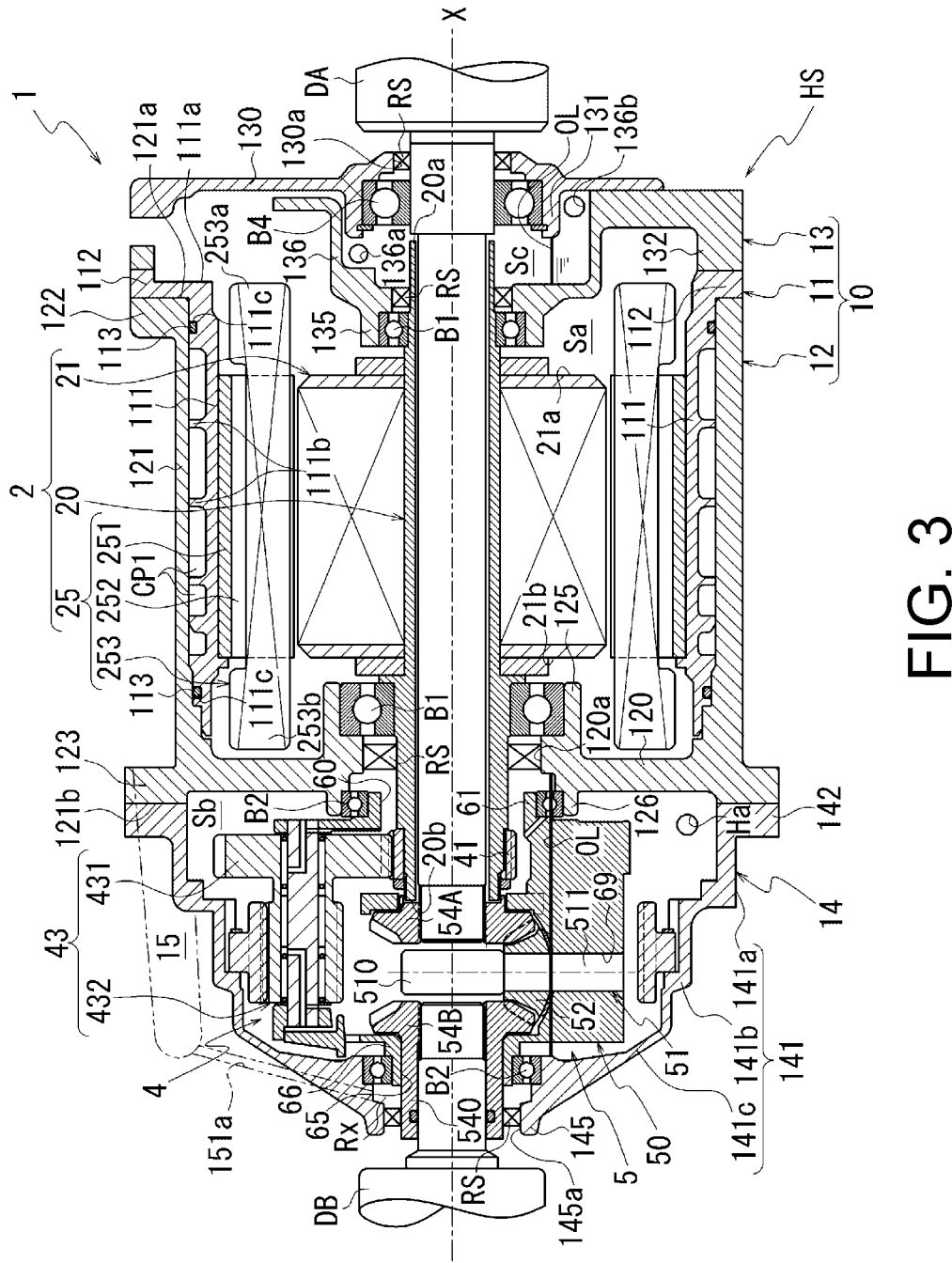
FIG. 3 is a schematic cross-sectional view of the unit.

FIG. 3 is a schematic cross-sectional view of the unit. FIG. 3 shows a state in which an inverter case is removed.

Figure 4:
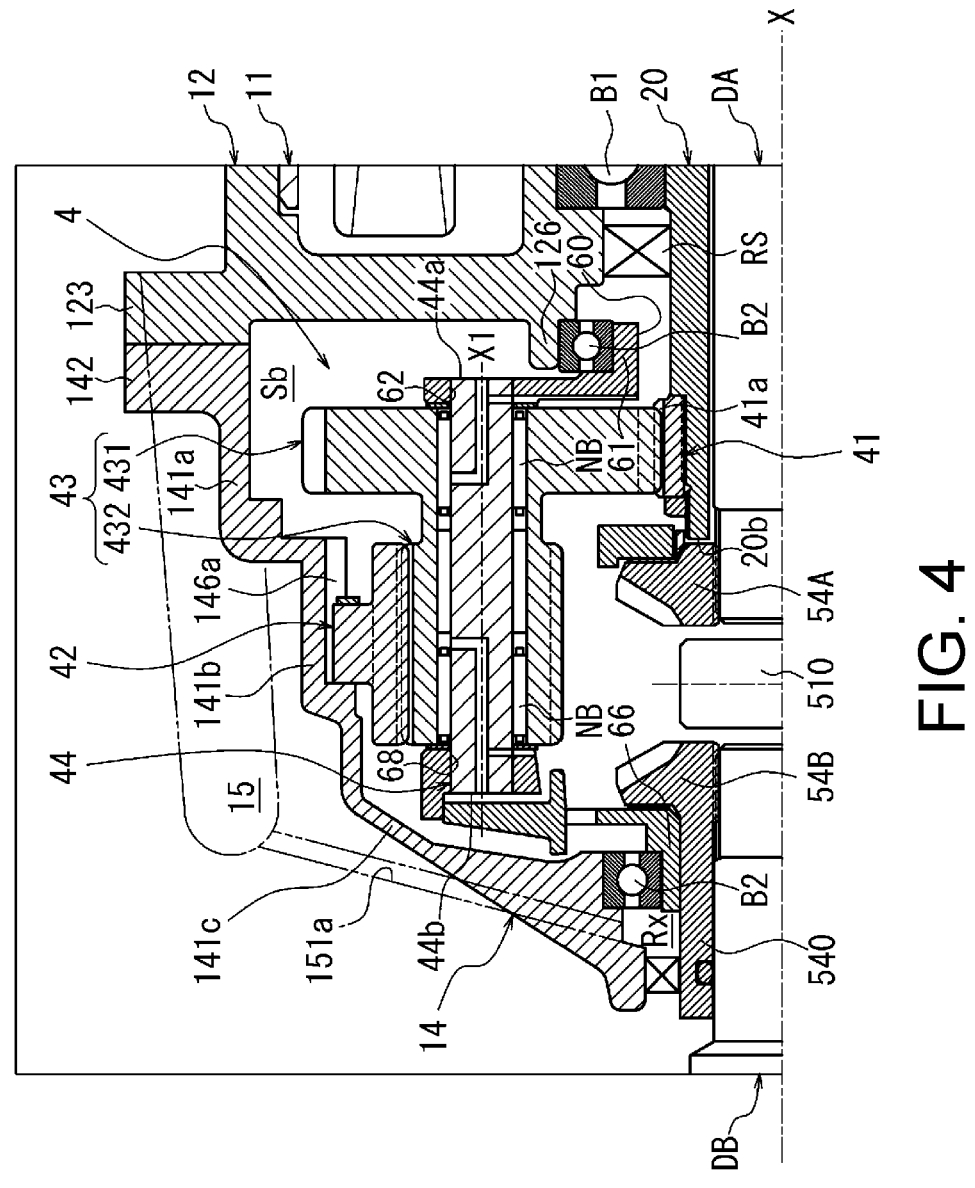
FIG. 4 is an enlarged view around a planetary reduction gear.

FIG. 4 is an enlarged view around a planetary reduction gear.

Figure 5:
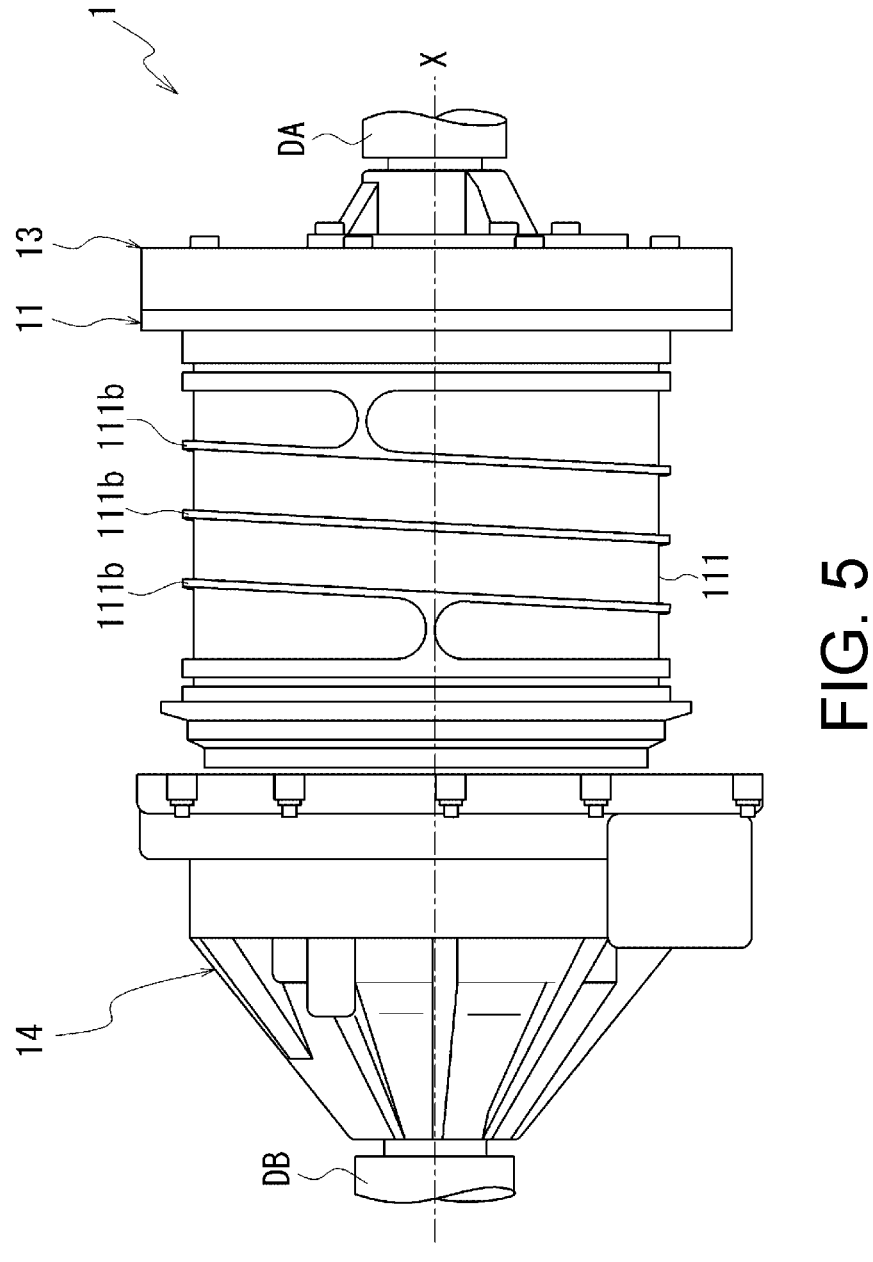
FIG. 5 is a top view of a motor case with a second case member removed.

FIG. 5 is a top view of a motor case with a second case member removed.

Figure 6:
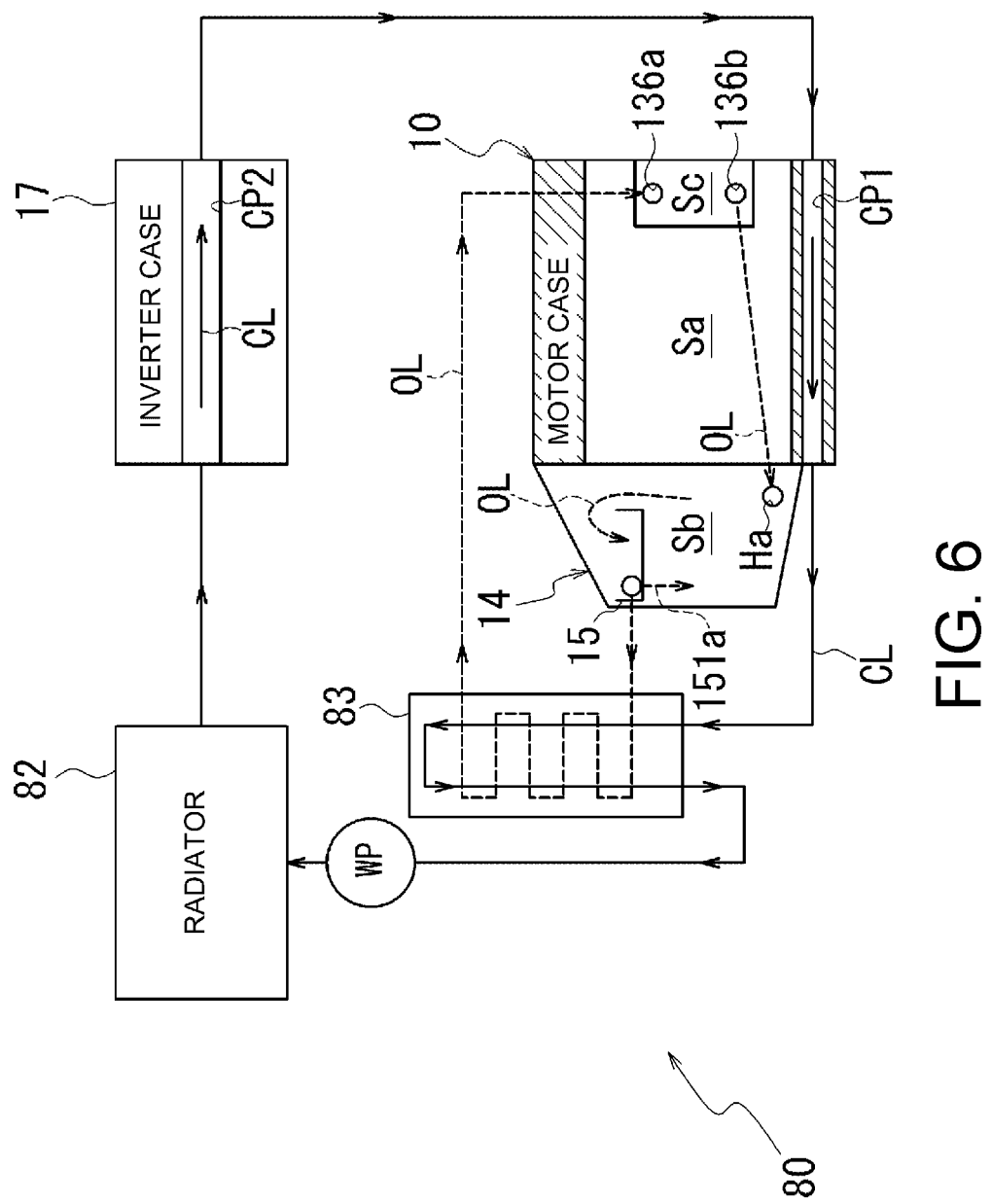
FIG. 6 is a diagram illustrating a flow of cooling water in the unit.

FIG. 6 is a diagram showing a circulation system of cooling water in the unit.

Figure 7:
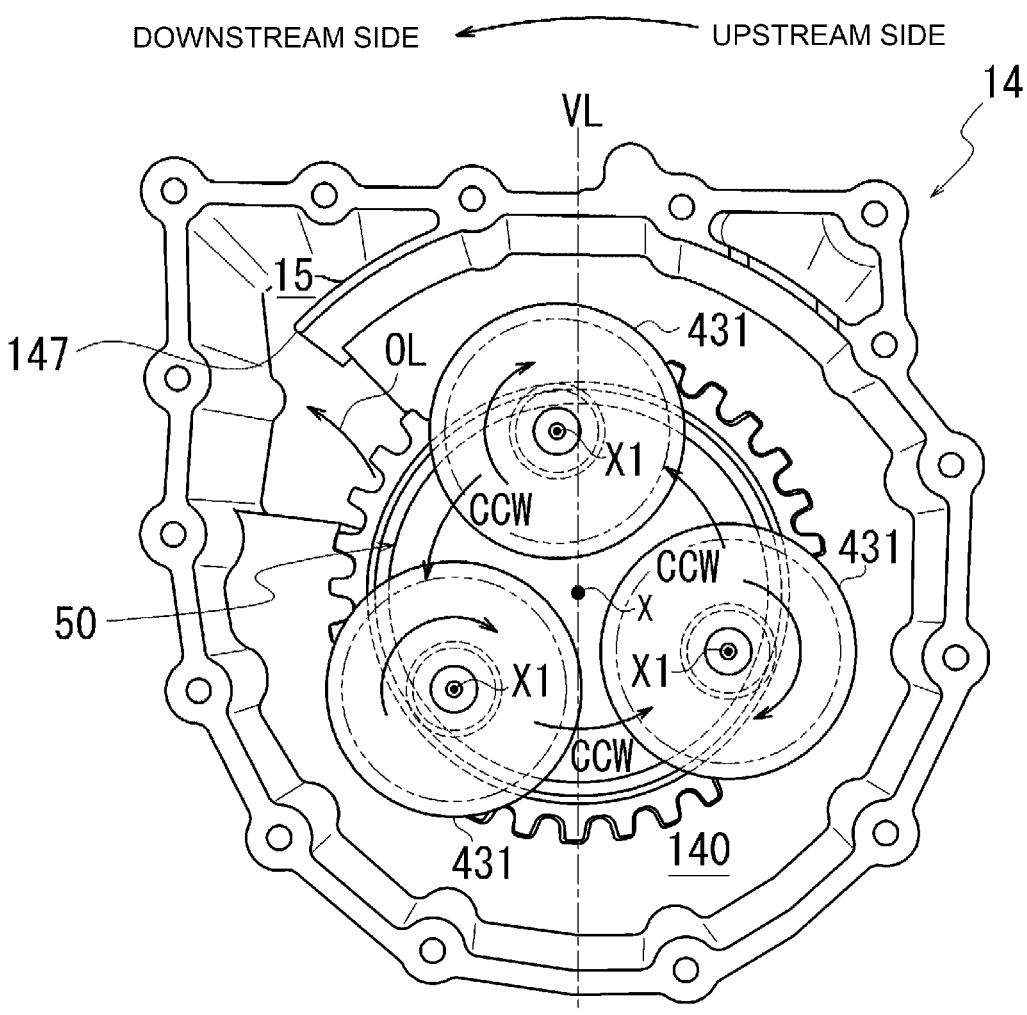
FIG. 7 is a diagram illustrating oil scraping up by a differential case.

FIG. 7 is a diagram illustrating a catch tank of a gear case.

As shown in FIG. 1, a unit 1 is a 3-in-1 unit, and includes a motor 2, a power transmission mechanism 3 that transmits the power output from the motor 2 to drive wheels K and K of a vehicle, and an inverter 7 (see FIG. 2) that is a power conversion device of the motor 2.

In the embodiment, as shown in FIG. 1, the unit 1 includes, as the power transmission mechanism 3, a planetary reduction gear 4 (reduction gear mechanism, planetary gear mechanism), a differential mechanism 5 (differential gear mechanism), and drive shafts DA and DB as output shafts. In the unit 1, the planetary reduction gear 4, the differential mechanism 5, and the drive shafts DA and DB are provided along a transmission path of output rotation about a rotation axis X of the motor 2. Axes of the drive shafts DA and DB are coaxial with the rotation axis X of the motor 2, and the differential mechanism 5 is coaxial with the motor 2.

In the unit 1, the output rotation of the motor 2 is decelerated by the planetary reduction gear 4 and input to the differential mechanism 5, and then transmitted to the left and right drive wheels K and K of the vehicle on which the unit 1 is mounted via the drive shafts DA and DB.

Here, the planetary reduction gear 4 is connected downstream of the motor 2. The differential mechanism 5 is connected downstream of the motor 2 via the planetary reduction gear 4. The drive shafts DA and DB are connected downstream of the differential mechanism 5.

As shown in FIG. 2, the unit 1 includes, as a 3-in-1 type housing, a housing HS that accommodates the motor 2, the power transmission mechanism 3 and the inverter 7. The housing HS includes one or more cases. The housing HS includes, for example, a motor case 10 that accommodates the motor 2, a gear case 14 that accommodates the power transmission mechanism 3, and an inverter case 17 that accommodates the inverter 7. The gear case 14 is joined to one end of the motor case 10 in a rotation axis X direction. The inverter case 17 is joined above the motor case 10 in a gravity direction when the unit 1 is mounted on the vehicle.

The inverter 7 is an electronic component including a smoothing capacitor, a power semi-conductor element, a driver board, and the like. The inverter 7 is electrically connected to the motor 2 inside the motor case 10 by wiring (not shown).

In the inverter case 17, a cooling path CP2 through which cooling water CL (see FIG. 6) for cooling the inverter 7 flows is formed.

The motor 2 has a portion that overlaps the differential mechanism 5 (differential gear mechanism) when viewed in an axial direction (see FIG. 3). Here, "when viewed in an axial direction" means when viewed from the rotation axis X direction. "When viewed in a radial direction" means when viewed from the radial direction of the rotation axis X direction.

When viewed in the axial direction, the motor 2 has a portion that overlaps the planetary reduction gear 4 (reduction gear mechanism).

When viewed in the axial direction, the planetary reduction gear 4 (reduction gear mechanism) has a portion that overlaps the differential mechanism 5 (differential gear mechanism).

When viewed in the axial direction, the planetary reduction gear 4 (reduction gear mechanism) has a portion that overlaps the motor 2.

When viewed in the axial direction, the differential mechanism 5 (differential gear mechanism) has a portion that overlaps the planetary reduction gear 4 (reduction gear mechanism).

When viewed in the axial direction, the differential mechanism 5 (differential gear mechanism) has a portion that overlaps the motor 2.

When viewed in the axial direction, the motor 2 has a portion that overlaps the differential mechanism 5 (differential gear mechanism).

As shown in FIG. 3, the motor case 10 includes a first case member 11, a second case member 12 fitted onto the first case member 11, and a cover member 13 joined to one end of the first case member 11. The first case member 11 includes a cylindrical support wall portion 111 and a flange-shaped joint portion 112 provided at one end 111a of the support wall portion 111.

The support wall portion 111 is provided in a direction along the rotation axis X of the motor 2. The motor 2 is accommodated inside the support wall portion 111.

The second case member 12 includes a cylindrical peripheral wall portion 121, a flange-shaped joint portion 122 provided at one end 121a of the peripheral wall portion 121, and a flange-shaped joint portion 123 provided at the other end 121b of the peripheral wall portion 121.

The peripheral wall portion 121 of the second case member 12 is formed with an inner diameter that allows the peripheral wall portion 121 to be fitted onto the support wall portion 111 of the first case member 11.

The first case member 11 and the second case member 12 are assembled by fitting the peripheral wall portion 121 of the second case member 12 onto the support wall portion 111 of the first case member 11.

The joint portion 122 at the one end 121a of the peripheral wall portion 121 comes into contact with the joint portion 112 of the first case member 11 from the rotation axis X direction. The joint portions 122 and 112 are connected with bolts (not shown).

As shown in FIG. 5, a protrusion 111b is provided on an outer periphery of the support wall portion 111 of the first case member 11. The protrusion 111b is a wall surrounding the rotation axis X at intervals. The protrusion 111b of the support wall portion 111 is provided in a spiral shape with a phase shifted from one end toward the other end in the rotation axis X direction. The protrusion 111b surrounds the outer periphery of the support wall portion 111 over the entire circumference of the support wall portion 111.

As shown in FIG. 3, the peripheral wall portion 121 of the second case member 12 is fitted onto the support wall portion 111 of the first case member 11. In this state, since an inner periphery of the peripheral wall portion 121 comes into contact with an outer periphery of the spiral protrusion 111b of the support wall portion 111, a space is formed between the peripheral wall portion 121 and the support wall portion 111. The space surrounds the rotation axis X with gaps therebetween and is continuously formed in a spiral shape in the rotation axis X direction. The spiral space forms a cooling path CP1 through which the cooling water CL (see FIG. 6), which is a coolant, flows. In FIG. 6, the spiral cooling path CP1 is simplified and shown as a straight line.

In the outer periphery of the support wall portion 111 of the first case member 11, ring grooves 111c and 111c are formed on both sides of the region where the protrusion 111b is provided. Seal rings 113 and 113 are fitted and attached to the ring grooves 111c and 111c.

The seal rings 113 are pressed against the inner periphery of the peripheral wall portion 121 fitted onto the support wall portion 111 to seal gaps between the outer periphery of the support wall portion 111 and the inner periphery of the peripheral wall portion 121.

A wall portion 120 (cover) extending radially inward is provided at the other end 121b of the second case member 12. The wall portion 120 is provided in a direction orthogonal to the rotation axis X. An opening 120a through which the drive shaft DA is inserted is provided in a region of the wall portion 120 intersecting the rotation axis X.

A tubular motor support portion 125 that surrounds the opening 120a and extends toward the motor 2 is provided on a surface of the wall portion 120 closer to the motor 2 (right side in the drawing).

The motor support portion 125 is inserted inside a coil end 253b, which will be described later. The motor support portion 125 faces an end portion 21b of a rotor core 21 with a gap therebetween in the rotation axis X direction. Bearings B1 are supported on an inner periphery of the motor support portion 125. An outer periphery of a motor shaft 20 is supported by the motor support portion 125 via the bearings B1.

A tubular wall portion 126 extending toward the differential mechanism 5 is provided on a surface of the wall portion 120 closer to the differential mechanism 5 (left side in the drawing). The tubular wall portion 126 has a cylindrical shape surrounding the opening 120a, and an inner periphery of the tubular wall portion 126 supports bearings B2. The bearings B2 support a tubular wall portion 61 of a differential case 50, which will be described later.

The cover member 13 includes a wall portion 130 orthogonal to the rotation axis X and a joint portion 132.

When viewed from the first case member 11, the cover member 13 is positioned on an opposite side (right side in the drawing) to the differential mechanism 5. The joint portion 132 of the cover member 13 is joined to the joint portion 112 of the first case member 11 from the rotation axis X direction. The cover member 13 and the first case member 11 are connected to each other with bolts (not shown). In this state, in the first case member 11, an opening of the support wall portion 111 closer to the joint portion 122 (right side in the drawing) is closed by the cover member 13.

In the cover member 13, an insertion hole 130a for the drive shaft DA is provided in a central portion of the wall portion 130.

Lip seals RS are provided on an inner periphery of the insertion hole 130a. The lip seals RS bring a lip portion (not shown) into elastic contact with an outer periphery of the drive shaft DA. A gap between the inner periphery of the insertion hole 130a and the outer periphery of the drive shaft DA is sealed by the lip seals RS.

A peripheral wall portion 131 surrounding the insertion hole 130a is provided on a surface of the wall portion 130 closer to the first case member 11 (left side in the drawing). The drive shaft DA is supported on an inner periphery of the peripheral wall portion 131 via bearings B4.

A motor support portion 135 and a connection wall 136 are provided on an inner diameter side of the joint portion 132. The motor support portion 135 is provided closer to the motor 2 (left side in the drawing) when viewed from the peripheral wall portion 131. The motor support portion 135 has a tubular shape surrounding the rotation axis X with a gap therebetween.

The cylindrical connection wall 136 is connected to an outer periphery of the motor support portion 135. The connection wall 136 is formed with a larger outer diameter than the peripheral wall portion 131 closer to the wall portion 130 (right side in the drawing). The connection wall 136 is provided along the rotation axis X and extends away from the motor 2. The connection wall 136 connects the motor support portion 135 and the joint portion 132.

One end 20a of the motor shaft 20 penetrates the inside of the motor support portion 135 from the motor 2 to the peripheral wall portion 131.

Bearings B1 are supported on an inner periphery of the motor support portion 135. The outer periphery of the motor shaft 20 is supported by the motor support portion 135 via the bearings B1.

A lip seal RS is provided at a position adjacent to the bearing B1.

Oil holes 136a and 136b are opened in an inner periphery of the connection wall 136. Oil OL flows from the oil hole 136a into a space (internal space Sc) surrounded by the connection wall 136. The oil OL flowing into the internal space Sc is discharged from the oil hole 136b. The lip seal RS is provided to prevent the oil OL in the connection wall 136 from flowing into the motor 2.

The gear case 14 includes a peripheral wall portion 141 and a flange-shaped joint portion 142 provided at an end portion of the peripheral wall portion 141 closer to the motor case 10. A support portion 145 for bearings B2, which will be described later, is provided at an end portion of the peripheral wall portion 141 on a side (left side in the drawing) opposite to the joint portion 142. The peripheral wall portion 141 includes a tubular wall portion 141a connected to the joint portion 142, an inclined portion 141c (inclined surface) connected to the support portion 145, and a connection wall portion 141b connecting the tubular wall portion 141a and the inclined portion 141c. The tubular wall portion 141a and the connection wall portion 141b are gradually reduced in diameter from the joint portion 142 and connected to the inclined portion 141c. The inclined portion 141c is inclined radially inward from the connection wall portion 141b toward the support portion 145. The planetary reduction gear 4 and the differential mechanism 5 as the power transmission mechanism 3 are accommodated inside the peripheral wall portion 141.

The gear case 14 is positioned closer to the differential mechanism 5 (left side in the drawing) when viewed from the motor case 10. The joint portion 142 of the gear case 14 is joined to the joint portion 123 of the second case member 12 of the motor case 10 from the rotation axis X direction. The gear case 14 and the second case member 12 are connected to each other with bolts (not shown).

A space formed inside the joined motor case 10 and gear case 14 is divided into two spaces by the wall portion 120 (cover) of the second case member 12. The motor case 10 side of the wall portion 120 is a motor chamber Sa that accommodates the motor 2, and the gear case 14 side is a gear chamber Sb that accommodates the power transmission mechanism 3. The wall portion 120 as a cover is sandwiched between the motor 2 and the differential mechanism 5 inside the housing HS.

The cover may have a portion accommodated in the housing HS, or the entire cover may be accommodated in the housing HS like the wall portion 120. The cover may be, for example, separate from the second case member 12. In this case, the cover may be sandwiched and fixed between the motor case 10 and the gear case 14. A part of the cover may be exposed outside of the housing HS.

The motor 2 includes the cylindrical motor shaft 20, the cylindrical rotor core 21 fitted onto the motor shaft 20, and a stator core 25 surrounding an outer periphery of the rotor core 21 with a gap therebetween.

In the motor shaft 20, the bearings B1 and B1 are fitted and fixed to both sides of the rotor core 21.

The bearings B1 positioned on the one end 20a (right side in the drawing) of the motor shaft 20 when viewed from the rotor core 21 are supported on the inner periphery of the motor support portion 135 of the cover member 13. The bearings B1 positioned on the other end 20b (left side in the drawing) are supported on the inner periphery of the cylindrical motor support portion 125 of the second case member 12.

The motor support portion 135 is disposed facing one end portion 21a of the rotor core 21 with a gap therebetween in the rotation axis X direction on an inner diameter side of a coil end 253a, which will be described later, and the motor support portion 125 is disposed facing the other end portion 21b of the rotor core 21 with a gap therebetween in the rotation axis X direction on an inner diameter side of a coil end 253b, which will be described later.

The rotor core 21 is formed by laminating a plurality of silicon steel plates. The silicon steel plates are fitted onto the motor shaft 20 such that relative rotation with respect to the motor shaft 20 is restricted.

When viewed from the rotation axis X direction of the motor shaft 20, the silicon steel plate has a ring shape. On an outer peripheral side of the silicon steel plate, N-pole and S-pole magnets (not shown) are alternately provided in a circumferential direction around the rotation axis X.

The stator core 25 surrounding the outer periphery of the rotor core 21 is formed by laminating a plurality of electromagnetic steel plates. The stator core 25 is fixed to the inner periphery of the cylindrical support wall portion 111 of the first case member 11.

Each of the electromagnetic steel plates includes a ring-shaped yoke portion 251 fixed to the inner periphery of the support wall portion 111, and a teeth portion 252 protruding from an inner periphery of the yoke portion 251 toward the rotor core 21.

In the present embodiment, the stator core 25 in which a winding 253 is wound around the plurality of teeth portions 252 in a distributed manner is adopted. The stator core 25 is longer than the rotor core 21 in the rotation axis X direction by lengths of the coil ends 253$a$ and 253$b$ protruding in the rotation axis X direction.

A stator core in which windings are concentratedly wound around each of the plurality of teeth portions 252 protruding toward the rotor core 21 may be adopted.

The opening 120$a$ is provided in the wall portion 120 (motor support portion 125) of the second case member 12. The other end 20$b$ of the motor shaft 20 penetrates through the opening 120$a$ to the differential mechanism 5 (left side in the drawing) and is positioned in the gear case 14.

The other end 20$b$ of the motor shaft 20 faces a side gear 54A, which will be described later, inside the gear case 14 with a gap therebetween in the rotation axis X direction.

The lip seals RS are inserted between the motor shaft 20 and the opening 120$a$ of the wall portion 120.

The oil OL for lubricating the planetary reduction gear 4 and the differential mechanism 5 are sealed on an inner diameter side of the gear case 14.

The lip seals RS are provided to prevent the oil OL in the gear case 14 from flowing into the motor case 10.

As shown in FIG. 4, a sun gear 41 of the planetary reduction gear 4 is spline-fitted in a region of the motor shaft 20 positioned in the gear case 14.

A teeth portion 41$a$ is formed on an outer periphery of the sun gear 41, and a large-diameter gear portion 431 of a stepped pinion gear 43 meshes with the teeth portion 41$a$.

The stepped pinion gear 43 includes the large-diameter gear portion 431 (large pinion) that meshes with the sun gear 41 and a small-diameter gear portion 432 (small pinion) that has a smaller diameter than the large-diameter gear portion 431.

The large-diameter gear portion 431 and the small-diameter gear portion 432 are integrated gear components disposed side by side in a direction of an axis X1 parallel to the rotation axis X.

An outer periphery of the small-diameter gear portion 432 meshes with an inner periphery of a ring gear 42. The ring gear 42 has a ring shape surrounding the rotation axis X with a gap therebetween. On an outer periphery of the ring gear 42, engagement teeth are provided, and the engagement teeth are spline-fitted to a teeth portion 146$a$ provided on an inner periphery of the connection wall portion 141$b$. The ring gear 42 is restricted from rotating about the rotation axis X.

A pinion shaft 44 penetrates inner diameter sides of the large-diameter gear portion 431 and the small-diameter gear portion 432. The stepped pinion gear 43 is rotatably supported on an outer periphery of the pinion shaft 44 via needle bearings NB, NB.

As shown in FIG. 3, the differential mechanism 5 includes the differential case 50 as an input element, the drive shafts DA and DB (output shafts) as output elements, and a differential gear set as a differential element. Although detailed description is omitted, the differential case 50 may be configured by two case members assembled in a rotation axis direction.

The differential case 50 also functions as a carrier that supports the stepped pinion gear 43 of the planetary reduction gear 4. The stepped pinion gear 43 is rotatably supported by the differential case 50 via the pinion shaft 44. As shown in FIG. 7, three stepped pinion gears 43 are disposed at intervals in the circumferential direction around the rotation axis X.

As shown in FIG. 3, in the differential case 50, as the differential gear set, a pinion mate gear 52, which is a bevel gear type differential gear, and side gears 54A and 54B are provided. The pinion mate gear 52 is supported by a pinion mate shaft 51.

The pinion mate shaft 51 includes a central member 510 disposed on the rotation axis X and shaft members 511 connected to an outer diameter side of the central member 510. Although not shown, the plurality of shaft members 511 are provided at equal intervals in the circumferential direction around the rotation axis X. The shaft members 511 are inserted through a support hole 69 extending in a radial direction of the differential case 50 and supported.

The pinion mate gear 52 is fitted onto the shaft members 511 and is rotatably supported.

In the differential case 50, the side gear 54A is positioned on one side of the central member 510 in the rotation axis X direction, and the side gear 54B is positioned on the other side of the central member 510. The side gears 54A and 54B are rotatably supported by the differential case 50.

The side gear 54A meshes with the pinion mate gear 52 from one side in the rotation axis X direction. The side gear 54B meshes with the pinion mate gear 52 from the other side in the rotation axis X direction.

An opening 60 and a tubular wall portion 61 surrounding the opening 60 and extending toward the motor case 10 are provided in a central portion of one end (right side in the drawing) of the differential case 50. An outer periphery of the tubular wall portion 61 is supported by the wall portion 120 of the second case member 12 via the bearings B2.

The drive shaft DA inserted through the opening 60 is inserted into the differential case 50 from the rotation axis X direction. The drive shaft DA penetrates the insertion hole 130$a$ of the wall portion 130 of the cover member 13, and is provided across inner diameter sides of the motor shaft 20 of the motor 2 and the sun gear 41 of the planetary reduction gear 4 in the rotation axis X direction.

As shown in FIG. 3, a through hole 65 and a tubular wall portion 66 surrounding the through hole 65 are formed in a central portion on the other end side (left side in the drawing) of the differential case 50. The bearings B2 are fitted onto the tubular wall portion 66. The bearings B2 fitted onto the tubular wall portion 66 are held by the support portion 145 of the gear case 14. The tubular wall portion 66 of the differential case 50 is rotatably supported by the gear case 14 via the bearings B2.

The drive shaft DB penetrating an opening 145$a$ of the gear case 14 is inserted into the support portion 145 from the rotation axis X direction. The drive shaft DB is rotatably supported by the support portion 145. The tubular wall portion 66 functions as a shaft support portion that supports the outer periphery of the drive shaft DB.

The lip seals RS are fixed to an inner periphery of the opening 145$a$. Lip portions (not shown) of the lip seals RS are in elastic contact with an outer periphery of the tubular wall portion 540 of the side gear 54B that is fitted onto the drive shaft DB.

Thus, a gap between the outer periphery of the tubular wall portion 540 of the side gear 54B and the inner periphery of the opening 145$a$ is sealed.

Inside the differential case 50, distal end portions of the drive shafts DA and DB face each other with a gap therebetween in the rotation axis X direction.

The side gears 54A and 54B supported by the differential case 50 are spline-fitted to outer peripheries of the distal end portions of the drive shafts DA and DB. The side gears 54A and 54B and the drive shafts DA and DB are coupled to each other so as to be integrally rotatable about the rotation axis X.

In this state, the side gears 54A and 54B are disposed facing each other with a gap therebetween in the rotation axis X direction. The central member 510 of the pinion mate shaft 51 is positioned between the side gears 54A and 54B.

The pinion mate gear 52 is assembled to the side gear 54A positioned on one side in the rotation axis X direction and the side gear 54B positioned on the other side in the rotation axis X direction such that teeth portions of the side gear 54A and the side gear 54B mesh with each other.

As shown in FIG. 4, a support hole 62 at one end 44a of the pinion shaft 44 is formed an outer diameter side of the opening 60 at the one end (right side in the drawing) of the differential case 50. A support hole 68 at the other end 44b of the pinion shaft 44 is formed at the other end (left side in the drawing) of the differential case 50.

The support holes 62 and 68 are formed at overlapping positions in the rotation axis X direction. The support holes 62 and 68 are formed at intervals in the circumferential direction around the rotation axis X in accordance with the position where the stepped pinion gear 43 is disposed. The one end 44a of the pinion shaft 44 is inserted into the support hole 62, and the other end 44b is inserted into the support hole 68. The other end 44b of the pinion shaft 44 is press-fitted into the support hole 68, so that the pinion shaft 44 is fixed to the differential case 50 so as not to be rotatable relative to the differential case 50. The stepped pinion gear 43 fitted onto the pinion shaft 44 is rotatably supported about the axis X1 parallel to the rotation axis X.

Although not shown, the oil OL for lubrication is stored inside the gear case 14. When the differential case 50 rotates about the rotation axis X, the oil OL is scraped up by the differential case 50.

Although detailed description is omitted, an oil passage, an oil hole, and the like for introducing the oil OL scraped up by the differential case 50 are provided in the differential case 50, the pinion shaft 44, and the like. As a result, the oil OL is easily introduced into rotating members such as the bearing B2 and the needle bearing NB.

As shown in FIG. 7, a catch tank 15 is provided above the differential case 50 inside the gear case 14. The catch tank 15 is positioned on one side (left side in the drawing) of a vertical line VL orthogonal to the rotation axis X. The catch tank 15 and an accommodation portion 140 of the differential case 50 communicate with each other via a communication port 147. Part of the oil OL scraped up by the differential case 50 and scattered flows into the catch tank 15 from the communication port 147 and is collected.

When the vehicle equipped with the unit 1 travels forward, the differential case 50 rotates in a counterclockwise direction CCW about the rotation axis X when viewed from the motor case 10. As shown in FIG. 4, the small-diameter gear portion 432 of the stepped pinion gear 43 meshes with the ring gear 42 fixed to an inner periphery of the gear case 14. Therefore, as shown in FIG. 7, the large-diameter gear portion 431 of the stepped pinion gear 43 revolves about the rotation axis X in the counterclockwise direction CCW while rotating clockwise about the axis X1.

The catch tank 15 is positioned on the left side of the vertical line VL, that is, on a downstream side in a rotation direction of the differential case 50. As a result, most of the oil OL scraped up by the differential case 50 rotating about the rotation axis X can flow into the catch tank 15.

As shown in FIG. 3, the catch tank 15 is connected to a space Rx between the lip seal RS and the bearing B2 via an oil passage 151a. The catch tank 15 is connected to an oil cooler 83 (see FIG. 6) via an oil passage, a pipe, or the like (not shown). The oil cooler 83 is connected to the oil hole 136a (see FIG. 3) formed in the connection wall 136 via a pipe, an oil passage, or the like (not shown).

An oil hole Ha is formed in the peripheral wall portion 141 of the gear case 14. The oil hole Ha is connected to the oil hole 136b formed in the internal space Sc via a pipe (not shown). The oil OL discharged from the internal space Sc through the oil hole 136b is supplied again into the gear chamber Sb through the oil hole Ha.

As shown in FIG. 6, the unit 1 is provided with a circulation system 80 for the cooling water CL. The circulation system 80 circulates the cooling water CL between the cooling path CP1 of the motor case 10 and the cooling path CP2 of the inverter case 17. The circulation system 80 further includes the oil cooler 83, a water pump WP, and a radiator 82 between the cooling path CP1 and the cooling path CP2, which are connected by pipes or the like through which the cooling water CL flows.

The water pump WP feeds the cooling water CL through the circulation system 80.

The radiator 82 is a device that dissipates the heat of the cooling water CL to cool the cooling water CL.

The oil cooler 83 is a heat exchanger that exchanges heat between the cooling water CL and the oil OL. The oil cooler 83 is provided with a flow path through which the cooling water CL and the oil OL flow. In FIG. 6, the oil cooler 83 is simplified.

The oil OL collected by the catch tank 15 provided in the gear chamber Sb of the gear case 14 is introduced into the oil cooler 83. The oil OL is cooled by heat exchange with the cooling water CL. The cooled oil OL is supplied from the oil hole 136a of the motor case 10 to the internal space Sc. The oil OL supplied to the oil cooler 83 is not limited to the oil OL collected by the catch tank 15, and may be supplied from another oil passage appropriately provided in the housing HS. The oil OL discharged from the oil cooler 83 may be supplied to a location other than the internal space Sc.

The cooling water CL is supplied to the oil cooler 83 after flowing through the cooling path CP2 in the inverter case 17 and the cooling path CP1 in the motor case 10. After the heat exchange with the oil OL in the oil cooler 83, the cooling water CL is cooled by the radiator 82 and supplied to the cooling path CP2 of the inverter case 17 again.

As shown in FIG. 2, the oil cooler 83 (heat exchanger) is provided on the inclined portion 141c (inclined surface) of the gear case 14.

The inclined portion 141c has a truncated cone shape that decreases in diameter in a direction away from the motor case 10. A space around the inclined portion 141c is larger than a space around the motor case 10 and the like of the unit 1 by the reduced diameter of the gear case 14. In the embodiment, the oil cooler 83 is disposed in the space around the inclined portion 141c. Hereinafter, a configuration of the oil cooler 83 will be described.

Figure 8:
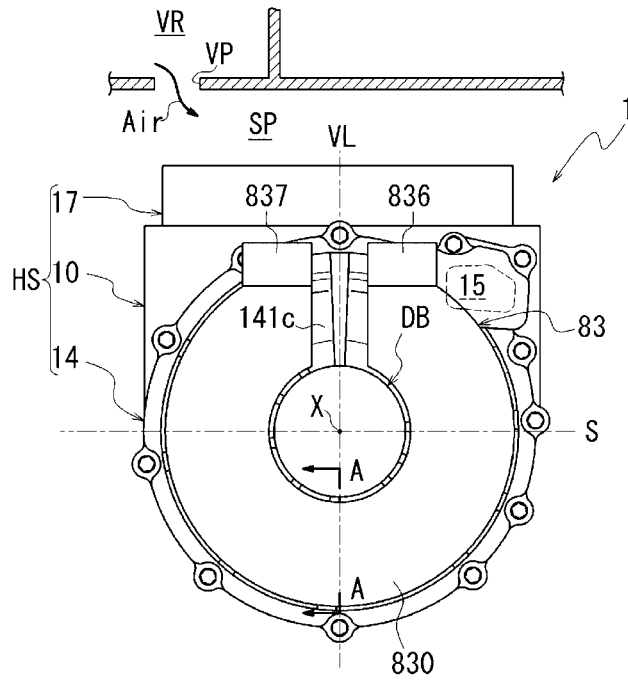
FIG. 8 is a diagram of a gear case when viewed from a rotation axis direction.

FIG. 8 is a diagram of the gear case 14 when viewed from the rotation axis X direction.

Figure 9:
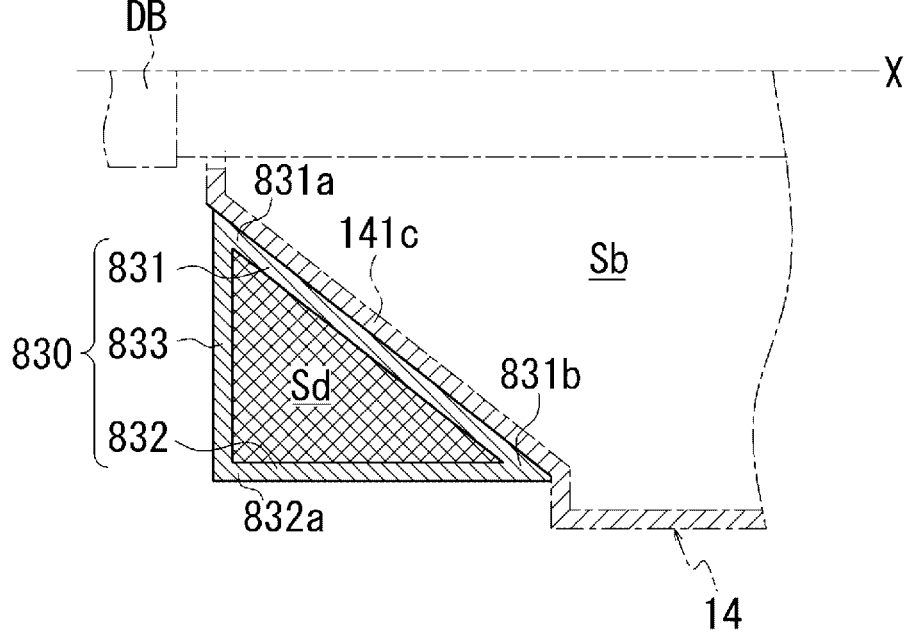
FIG. 9 is a cross-sectional view of a main body portion of an oil cooler taken along line A-A in FIG. 8.

FIG. 9 is a cross-sectional view of a main body portion 830 of the oil cooler 83 taken along line A-A in FIG. 8. In FIG. 9, the gear case 14 and the drive shaft DB are indicated by imaginary lines for convenience of description.

Figure 10:
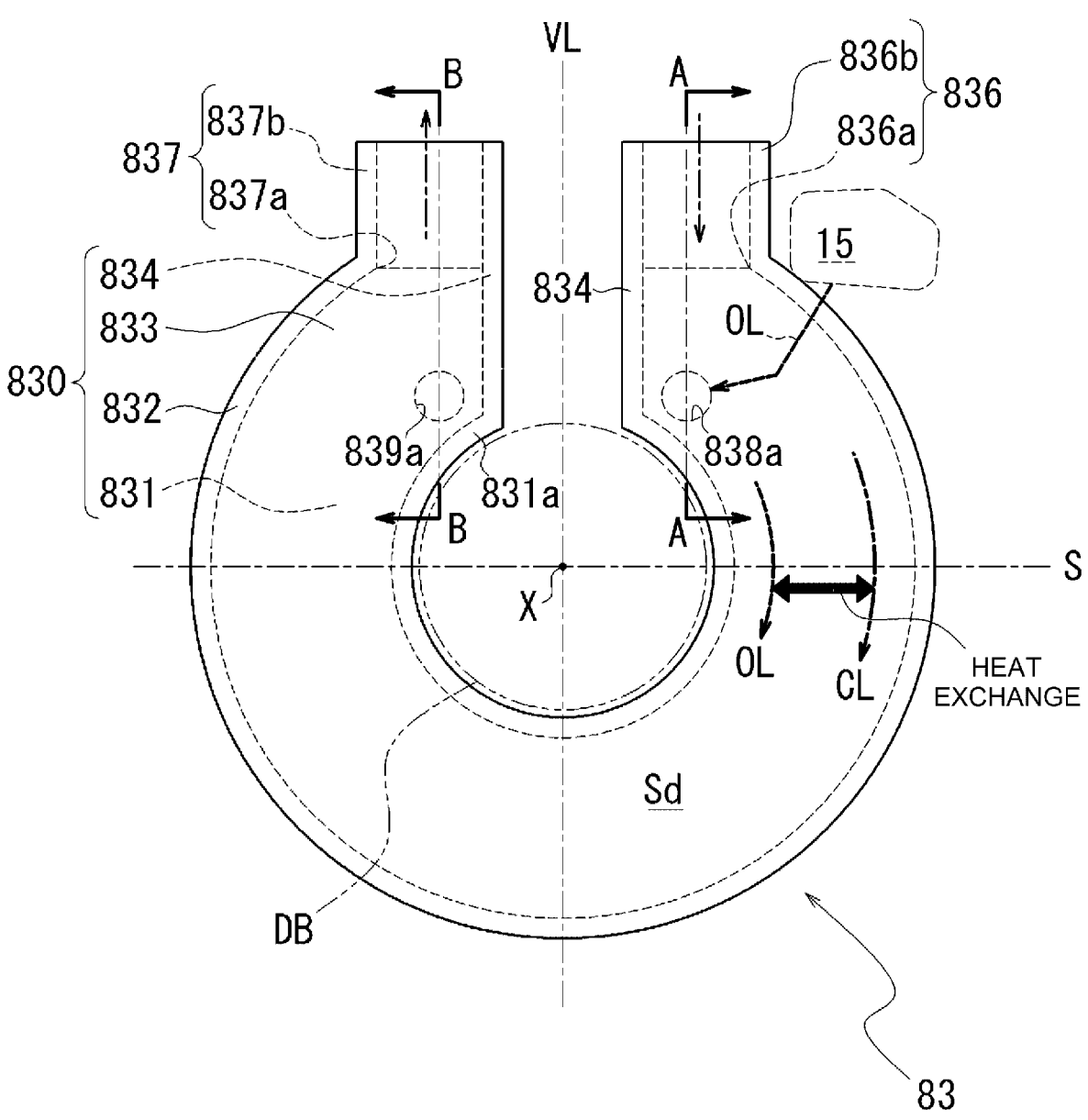
FIG. 10 is a diagram illustrating an oil flow path and a cooling water flow path in the oil cooler.

FIG. 10 is a diagram of the oil cooler 83 when viewed in the rotation axis X direction.

Figure 11:
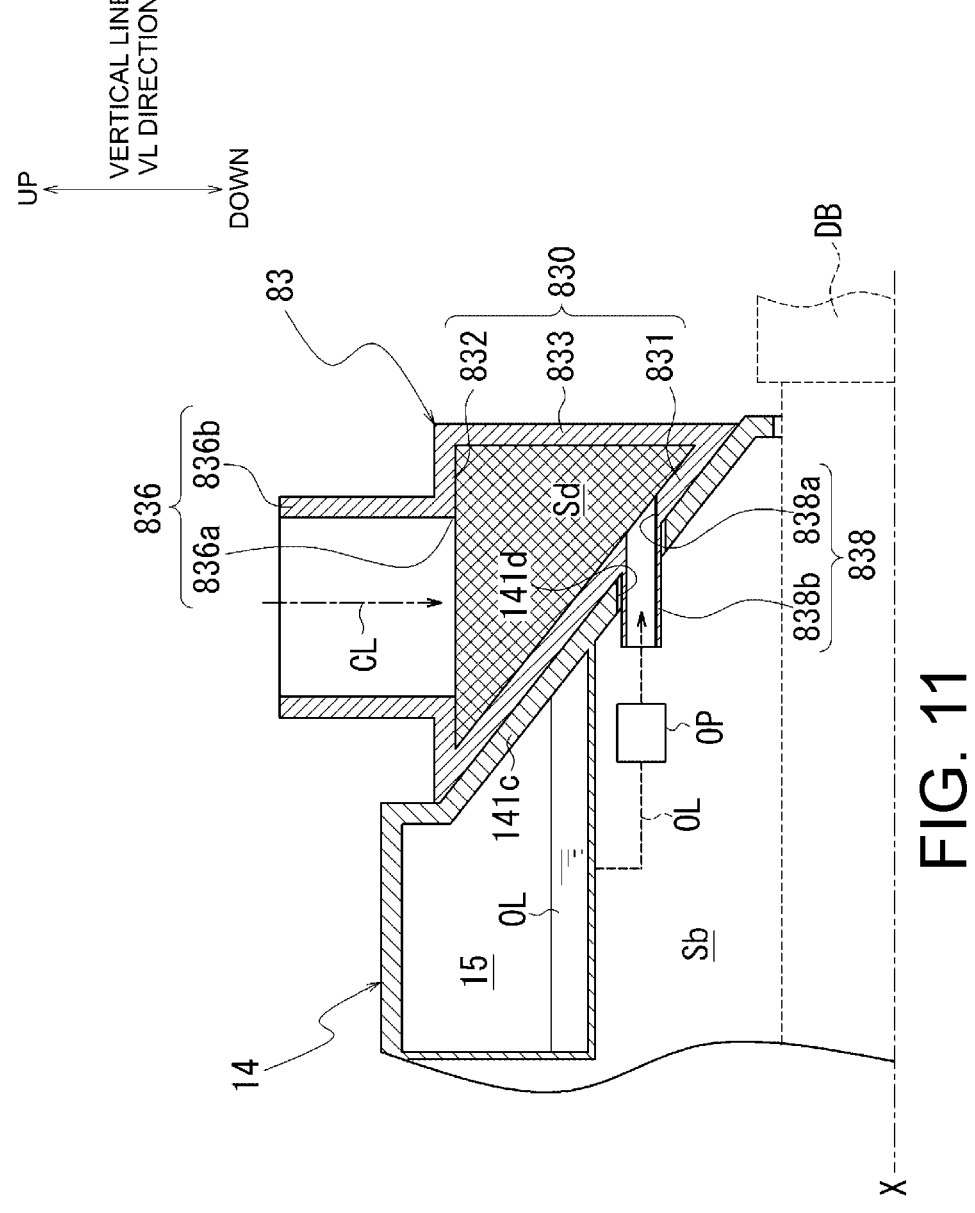
FIG. 11 is a schematic cross-sectional view taken along line A-A in FIG. 9.

FIG. 11 is a schematic cross-sectional view taken along line A-A in FIG. 10.

Figure 12:
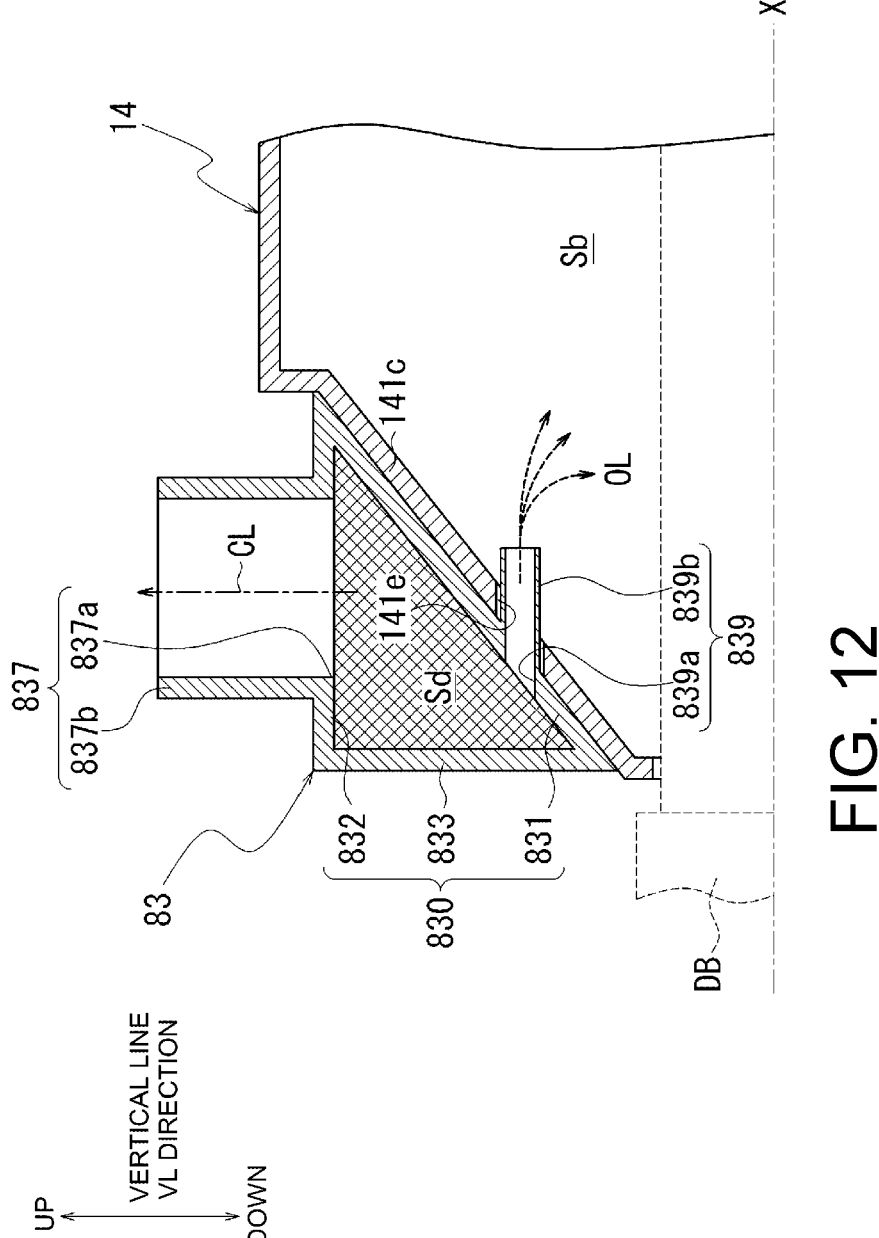
FIG. 12 is a schematic cross-sectional view taken along line B-B in FIG. 9.

FIG. 12 is a schematic cross-sectional view taken along line A-A in FIG. 10.

In FIGS. 11 and 12, the gear case 14 is shown in a simplified manner to explain the flow of the oil OL between the gear case 14 and the oil cooler 83.

As shown in FIG. 8, the oil cooler 83 is disposed adjacent to the catch tank 15 provided in an upper portion of the gear case 14. The oil cooler 83 includes the main body portion 830 (arc-shaped portion) formed in an arc shape when viewed in the rotation axis X direction. The main body portion 830 is disposed in the circumferential direction around the rotation axis X so as to surround the drive shaft DB. Although not shown, the main body portion 830 is fixed to the inclined portion 141*c* via bolts or the like. One end in a longitudinal direction of the main body portion 830 is positioned on one side (right side in the drawing) of the vertical line VL, and the other end is positioned on the other side (left side in the drawing) of the vertical line VL. With respect to a horizontal plane S passing through the rotation axis X and orthogonal to the vertical line VL, the main body portion 830 has a portion positioned above the horizontal plane S and a portion positioned below the horizontal plane S.

As shown in FIG. 9, the main body portion 830 has a triangular shape in a cross-sectional view. The main body portion 830 includes a first wall portion 831, a second wall portion 832, and a third wall portion 833.

The first wall portion 831 is a portion disposed to face an outer periphery of the inclined portion 141*c* when the oil cooler 83 is attached to the gear case 14, and is provided in a direction along the rotation axis X. One end portion 831*a* of the first wall portion 831 in the rotation axis X direction is positioned on an inner diameter side (rotation axis X side) with respect to the other end 831*b*, and the first wall portion 831 is disposed inclined with respect to the rotation axis X. The first wall portion 831 is inclined toward an outer diameter side from the one end portion 831*a* toward the other end portion 831*b*.

The second wall portion 832 extends in the rotation axis X direction from the end portion 831*b* of the first wall portion 831.

The third wall portion 833 extends outward in the radial direction of the rotation axis X from the end portion 831*a* of the first wall portion 831. The third wall portion 833 is provided in a direction substantially orthogonal to the rotation axis X when the oil cooler 83 is attached to the gear case 14.

The third wall portion 833 connects the end portion 831*a* of the first wall portion 831 and one end portion 832*a* of the second wall portion 832. As shown in FIG. 10, the one end and the other end in the longitudinal direction of the main body portion 830 are closed by fourth wall portions 834 and 834, respectively. The fourth wall portions 834 and 834 extend and are connected to the first wall portion 831, the second wall portion 832, and the third wall portion 833.

An internal space Sd surrounded by the first wall portion 831, the second wall portion 832, the third wall portion 833, and the fourth wall portion 834 is formed in the main body portion 830. Flow paths for the oil OL and the cooling water CL are provided in the internal space Sd. For example, the flow paths may be configured by laminating a plurality of plates each having a passage hole formed therein Heat is exchanged by the oil OL and the cooling water CL flowing through the respective flow paths. In FIG. 9, the internal space Sd is cross-hatched, and detailed illustration is omitted. Arrows of the oil OL and the cooling water CL shown in FIG. 10 indicate rough flow directions, not actual flow paths.

As shown in FIG. 11, the inclined portion 141*c* constitutes part of a wall surface of the catch tank 15 formed in the upper portion of the gear case 14. That is, the internal space Sd of the oil cooler 83 and the catch tank 15 are adjacent to each other with the inclined portion 141*c* and the first wall portion 831 interposed therebetween.

As shown in FIG. 10, the second wall portion 832 has an arc shape surrounding the rotation axis X with a gap therebetween when viewed from the rotation axis X direction. When viewed from the rotation axis X direction, the end portion 831*a* of the first wall portion 831 surrounds the rotation axis X with a gap therebetween and has an arc shape with an outer diameter smaller than that of the second wall portion 832.

An introduction portion 836 and a discharge portion 837 for the cooling water CL are provided above the main body portion 830 in the vertical line VL direction. The introduction portion 836 is provided at one end (right side in the drawing) in the longitudinal direction of the main body portion 830, and the discharge portion 837 is provided at the other end (left side in the drawing).

The introduction portion 836 has an opening 836*a* provided through the second wall portion 832 of the main body portion 830, and a peripheral wall portion 836*b* surrounding the opening 836*a* and extending upward in the vertical line VL direction. The introduction portion 836 communicates with the flow path (not shown) for the cooling water CL provided in the internal space Sd of the main body portion 830 via the opening 836*a*.

The discharge portion 837 has an opening 837*a* provided through the second wall portion 832 of the main body portion 830, and a peripheral wall portion 837*b* surrounding the opening 837*a* and extending upward in the vertical line VL direction. The discharge portion 837 communicates with the flow path (not shown) for the cooling water CL provided in the internal space Sd of the main body portion 830 via the opening 837*a*.

The introduction portion 836 and the discharge portion 837 are positioned above the horizontal plane S. The main body portion 830 has a portion positioned above the horizontal plane S and connected to the introduction portion 836 and the discharge portion 837, and a portion positioned below the horizontal plane S. In other words, the introduction portion 836 is connected to the discharge portion 837 via the portion positioned below the horizontal plane S of the main body portion 830. The cooling water CL introduced into the internal space Sd of the main body portion 830 from the introduction portion 836 flows from the one end (right side in the drawing) to the other end (left side in the drawing) in the longitudinal direction of the main body portion 830, and is discharged from the discharge portion 837.

The peripheral wall portion 836*b* of the introduction portion 836 is connected to the cooling path CP1 (see FIG. 6) of the motor case 10 via a pipe or the like (not shown). The peripheral wall portion 837*b* of the discharge portion 837 is connected to the radiator 82 (see FIG. 6) via a pipe or the like (not shown). As shown in FIG. 8, the catch tank 15 is positioned on one side (right side in the drawing) of the vertical line VL along which the introduction portion 836 is disposed when viewed in the rotation axis X direction.

As shown in FIG. 11, the main body portion 830 has an oil inlet 838. The oil inlet 838 has a hole 838*a* penetrating the first wall portion 831 in the rotation axis X direction, and a peripheral wall portion 838*b* surrounding the hole 838*a* and extending in the rotation axis direction toward the gear case 14.

As shown in FIG. 12, the main body portion 830 has an oil outlet 839. The oil outlet 839 has a hole 839*a* penetrating the first wall portion 831 in the rotation axis X direction, and a peripheral wall portion 839*b* surrounding the hole 839*a*.

As shown in FIG. 10, the hole 838*a* is provided at one end (right side in the drawing) in the longitudinal direction of the main body portion 830, and the hole 839*a* is provided at the other end (left side in the drawing). That is, the oil inlet 838*a* is positioned on the same side as the introduction portion 836 of the cooling water CL, and the oil outlet 839*a* is positioned on the same side as the discharge portion 837.

The hole 838*a* and the hole 839*a* are positioned above the horizontal plane S. The hole 838*a* is connected to the hole 839*a* via the portion of the main body portion 830 positioned below the horizontal plane S. The oil OL introduced into the internal space Sd of the main body portion 830 from the hole portion 838*a* flows from the one end (right side in the drawing) to the other end (left side in the drawing) in the longitudinal direction of the main body portion 830 and is discharged from the hole 839*a*, similarly to the cooling water CL.

As shown in FIG. 11, the inclined portion 141*c* of the gear case 14 is provided with an opening 141*d* at a position overlapping the hole 838*a* in the rotation axis X direction. The opening 141*d* penetrates the inclined portion 141*c* in the rotation axis X direction. The peripheral wall portion 838*b* of the oil inlet 838 is inserted through the opening 141*d* and inserted into the gear chamber Sb.

The peripheral wall portion 838*b* is connected to the catch tank 15 in the gear chamber Sb via an electric oil pump OP, an oil passage, a pipe, or the like (not shown). As a result, part of the oil OL collected in the catch tank 15 is fed by the electric oil pump OP and introduced into the internal space Sd of the main body portion 830. A seal ring for preventing oil leakage may be provided between the peripheral wall portion 838*b* and the opening 141*d*. The hole 839*a* may be provided with a filter for filtering contaminants contained in the oil OL.

As shown in FIG. 12, the inclined portion 141*c* of the gear case 14 is provided with an opening 141*e* at a position overlapping the hole 839*a* in the rotation axis X direction. The opening 141*e* penetrates the inclined portion 141*c* in the rotation axis X direction. The peripheral wall portion 839*b* of the oil outlet 839 is inserted through the opening 141*e* and inserted into the gear chamber Sb.

The peripheral wall portion 839*b* is connected to the oil hole 136*a* (see FIG. 3) formed in the connection wall 136 via an oil passage, a pipe, or the like (not shown). As a result, the oil OL discharged from the internal space Sd of the main body portion 830 is introduced into the internal space Sc (see FIG. 3) formed in the connection wall 136. Although not shown, a seal ring for preventing oil leakage may be provided between the peripheral wall portion 839*b* and the opening 141*e*. The peripheral wall portion 839*b* may be connected to the internal space Sc via a pipe or the like provided outside the housing HS instead of being inserted into the gear chamber Sb.

The operation of the unit 1 having such a configuration will be described.

As shown in FIG. 1, in the unit 1, the planetary reduction gear 4, the differential mechanism 5, and the drive shafts DA and DB are provided along a transmission path of output rotation of the motor 2.

As shown in FIG. 3, when the motor 2 is driven and the rotor core 21 rotates about the rotation axis X, the rotation is input to the sun gear 41 of the planetary reduction gear 4 via the motor shaft 20 that rotates integrally with the rotor core 21.

In the planetary reduction gear 4, the sun gear 41 serves as an input portion for the output rotation of the motor 2, and the differential case 50 supporting the stepped pinion gear 43 serves as an output portion for the input rotation.

As shown in FIG. 4, when the sun gear 41 rotates about the rotation axis X by the input rotation, the stepped pinion gear 43 (large-diameter gear portion 431 and small-diameter gear portion 432) rotates about the axis X1 by the rotation input from the sun gear 41.

Here, the small-diameter gear portion 432 of the stepped pinion gear 43 meshes with the ring gear 42 fixed to the inner periphery of the gear case 14. Therefore, the stepped pinion gear 43 revolves around the rotation axis X while rotating about the axis X1.

Here, in the stepped pinion gear 43, an outer diameter of the small-diameter gear portion 432 is smaller than an outer diameter of the large-diameter gear portion 431.

As a result, the differential case 50 supporting the stepped pinion gear 43 rotates about the rotation axis X at a rotation speed lower than that of the rotation input from the motor 2.

Therefore, the rotation input to the sun gear 41 of the planetary reduction gear 4 is greatly decelerated by the stepped pinion gear 43 and then output to the differential case 50 (differential mechanism 5).

As shown in FIG. 3, when the differential case 50 rotates about the rotation axis X by the input rotation, the drive shafts DA and DB meshing with the pinion mate gear 52 rotate about the rotation axis X in the differential case 50. As a result, the left and right drive wheels K and K (see FIG. 1) of the vehicle equipped with the unit 1 are rotated by the transmitted rotational driving force.

As shown in FIG. 3, the oil OL for lubrication is stored in the gear chamber Sb. In the gear chamber Sb, when the output rotation of the motor 2 is transmitted, the stored oil OL is scraped up by the differential case 50 rotating about the rotation axis X.

As shown in FIGS. 3 and 4, the scraped-up oil OL lubricates a meshing portion between the sun gear 41 and the large-diameter gear portion 431, a meshing portion between the small-diameter gear portion 432 and the ring gear 42, and meshing portions between the pinion mate gear 52 and the side gears 54A and 54B.

As shown in FIG. 7, the differential case 50 rotates in the counterclockwise direction CCW about the rotation axis X.

The catch tank 15 is provided on an upper portion of the gear case 14. The catch tank 15 is positioned on the downstream side in the rotation direction of the differential case 50, and part of the oil OL scraped up by the differential case 50 flows into the catch tank 15.

As shown in FIG. 3, part of the oil OL flowing into the catch tank 15 is supplied to the space Rx between the lip seal RS and the bearing B2 via the oil passage 151*a* to lubricate the bearing B2. Part of the oil OL flowing into the catch tank 15 is fed to the electric oil pump OP and introduced to the peripheral wall portion 838*b* (see FIG. 11) of the oil inlet 838 of the oil cooler 83. The oil OL introduced into the peripheral wall portion 838*b* is introduced into the internal space Sd of the main body portion 830 through the hole 838*a*. As shown in FIG. 10, the oil OL introduced to the one end (right side in the drawing) in the longitudinal direction of the main body portion 830 flows toward the hole 839*a* at the other end through the flow path (not shown) formed in the internal space Sd.

As shown in FIG. 11, the cooling water CL after flowing through the cooling path CP1 (see FIG. 6) is introduced into the internal space Sd of the oil cooler 83 via the introduction portion 836. As shown in FIG. 10, the cooling water CL introduced to the one end in the longitudinal direction of the main body portion 830 flows toward the discharge portion 837 at the other end through the flow path (not shown) formed in the internal space Sd.

The oil OL introduced into the oil cooler 83 is scraped up by the differential case 50 (see FIG. 7) and flows into the catch tank 15, and the temperature of the oil OL rises. The oil OL whose temperature rises is cooled by exchanging heat with the cooling water CL whose temperature is lower than that of the oil OL in the internal space Sd.

As shown in FIG. 10, the oil OL cooled by heat exchange with the cooling water CL is discharged from the internal space Sd through the hole 839*a* of the oil outlet 839. As shown in FIG. 12, the oil OL is returned from the peripheral wall portion 839*b* of the oil outlet 839 to the inside of the gear chamber Sb. Then, the oil OL is supplied to the internal space Sc (see FIG. 3) formed in the connection wall 136 via an oil passage, a pipe, or the like (not shown). The oil OL supplied to the internal space Sc lubricates the bearing B4 and is discharged from the oil hole 136*b*. The oil OL discharged from the oil hole 136*b* is supplied into the gear chamber Sb from the oil hole Ha via a pipe or the like (not shown).

As shown in FIG. 3, the housing HS includes the inclined portion 141*c* as an inclined surface surrounding the differential mechanism 5 in the radial direction of the rotation axis X. As shown in FIG. 2, the oil cooler 83 is disposed at a position overlapping the inclined portion 141*c* when viewed in the rotation axis X direction. Disposing the oil cooler 83 utilizing the space around the inclined portion 141*c* contributes to a reduction in dimension of the unit 1 in the radial direction of the rotation axis X.

As shown in FIG. 8, the oil cooler 83 disposed to surround the inclined portion 141*c* overlaps the inclined portion 141*c* when viewed in the radial direction of the rotation axis X. This also contributes to a reduction in dimension of the unit 1 in the rotation axis X direction.

As shown in FIG. 8, the main body portion 830 of the oil cooler 83 has the portion positioned above the horizontal plane S passing through the rotation axis X and orthogonal to the vertical line VL direction. As shown in FIG. 2, the oil cooler 83 has a portion positioned above the differential mechanism 5 in the vertical line VL direction. Further, the oil cooler 83 has a portion overlapping the stepped pinion gear 43 in the rotation axis X direction. As a result, the oil cooler 83 has a portion positioned above the unit 1 in the vertical line VL direction.

As shown in FIG. 3, in the unit 1, the motor 2 and the differential mechanism 5 are coaxial, and the differential mechanism 5 has a portion overlapping the motor 2 when viewed in the rotation axis X direction. As described above, in the unit 1 in which the motor 2 and the differential mechanism 5 are coaxial, the layout on an upper side in the vertical line VL direction (vehicle height direction) is less constrained than on a lower side in the vertical line VL direction (vehicle height direction). Since the oil cooler 83 has the portion positioned above the unit 1 in the vertical line VL direction in which the layout is less constrained, a surface area of the oil cooler 83 can be increased. Since a heat exchange rate of the oil cooler 83 increases as the surface area increases, the oil OL can be efficiently cooled.

The introduction portion 836 of the cooling water CL positioned above the horizontal plane S is connected to the discharge portion 837 via the main body portion 830 having the portion positioned below the horizontal plane S. As a result, the cooling water CL introduced into the internal space Sd of the main body portion 830 from the introduction portion 836 can flow to the discharge portion 837 using gravity. As described above, the circulation system 80 (see FIG. 6) is provided with the water pump WP that feeds the cooling water CL, and the cooling water CL can flow more smoothly using gravity.

As shown in FIG. 10, the hole 838*a* of the oil inlet 838 positioned above the horizontal plane S is connected to the hole 839*a* of the oil outlet 839 via the main body portion 830 having the portion positioned below the horizontal plane S. As a result, the oil OL introduced into the internal space Sd of the main body portion 830 from the hole 838*a* can flow to the hole 839*a* using gravity. As shown in FIG. 12, the oil OL from the catch tank 15 is fed by the oil pump OP, and the oil OL can flow more smoothly using gravity.

As shown in FIG. 8, the internal space Sd of the oil cooler 83 is disposed adjacent to the catch tank 15. Therefore, the cooling water CL introduced into the internal space Sd exchanges heat with the oil OL in the catch tank 15 in addition to the oil OL introduced into the internal space Sd. Further, the catch tank 15 is positioned on the same side as the introduction portion 836 for the cooling water CL. The low-temperature cooling water CL before heat exchange with the oil OL flows through the introduction portion 836. Since the oil OL in the catch tank 15 exchanges heat with the low-temperature cooling water CL flowing through the introduction portion 836, the heat exchange efficiency can be improved.

The unit 1 may be disposed on a rear side of a vehicle which is less likely to be affected by the traveling wind of the vehicle. As shown in FIG. 8, when the unit 1 is mounted on the vehicle, a vehicle room VR is disposed above a space SP in which the unit 1 is disposed. The vehicle is provided with a ventilation port VP that communicates the space SP in which the unit 1 is disposed with the vehicle room VR.

By driving an air conditioner in the vehicle room VR or opening windows of the vehicle room VR, the air Air in the vehicle room VR is discharged from the ventilation port VP and flows into the space SP. The temperature of the air Air in the vehicle room VR is adjusted in accordance with the outside air temperature. For example, when the outside air temperature is high, cooling is used in the vehicle or the windows are opened. For example, when the outside air temperature is low, heating is used.

When the air Air whose temperature is adjusted according to the outside air temperature flows into the space SP, the air exchanges heat with the housing HS disposed in the space SP. As a result, on the rear side of the vehicle which is less likely to be affected by the traveling wind, the heat can be exchanged in a direction in which the temperature of the housing HS approaches the proper temperature. Further, the oil cooler 83 attached to the housing HS can also exchange heat with the air Air. Thereby, the temperature rise of the oil cooler 83 can be reduced, and as a result, the heat exchange efficiency between the oil OL and the cooling water CL in the oil cooler 83 is improved. By improving the heat exchange efficiency of the oil cooler 83, the size of the oil cooler 83 can be reduced, which contributes to a reduction in dimensions of the entire housing HS.

A fan or the like may be provided so that the air Air in the vehicle room VR easily flows into the space SP.

As described above, the unit 1 according to the embodiment has the following configuration.

(1) The unit 1 includes the oil cooler 83 (heat exchanger) and the housing HS configured to accommodate the differential mechanism 5 (differential gear mechanism).

The housing HS has a portion having the inclined portion 141*c* (inclined surface) surrounding the differential mechanism 5 in the radial direction.

When viewed in the rotation axis X direction (when viewed in the axial direction), the oil cooler 83 has a portion that overlaps the inclined portion 141*c*.

This configuration contributes to a reduction in dimension of the unit 1 in at least one direction.

In the rotation axis X direction, the inclined portion 141*c* of the gear case 14 is formed such that an outer diameter thereof decreases with increasing distance from the motor case 10. When the oil cooler 83 is disposed as described above, the oil cooler 83 does not need to protrude greatly in the radial direction of the housing HS, which contributes to a reduction in dimension of the unit 1 in at least the radial direction of the rotation axis X.

(2) When viewed in the radial direction of the rotation axis X (when viewed in the radial direction), the oil cooler 83 has a portion that overlaps the inclined portion 141*c*.

When the oil cooler 83 is disposed as described above, the oil cooler 83 does not need to protrude greatly in the rotation axis X direction of the housing HS, which contributes to a reduction in dimension of the unit 1 in both the radial direction of the rotation axis X and the rotation axis X direction.

(3, 4) In the unit 1, the differential mechanism 5 has a portion that overlaps the motor 2 when viewed in the rotation axis X direction.

The oil cooler 83 has a portion positioned above the horizontal plane S that passes through an axis of the drive shaft DB, which is an output shaft of the differential mechanism 5, and is orthogonal to the vertical line VL direction (gravity direction).

In the unit 1 in which the motor 2 and the differential mechanism 5 are coaxial, the layout on an upper side in the vertical line VL direction (vehicle height direction) is less constrained than on a lower side in the vertical line VL direction (vehicle height direction). Therefore, a surface area of the oil cooler 83 can be increased by disposing the oil cooler 83 upward in the vehicle height direction. Since a heat exchange rate of the oil cooler 83 increases as the surface area increases, the oil OL can be efficiently cooled.

(5) The unit 1 includes the oil cooler 83 and the housing HS configured to accommodate the differential mechanism 5.

The differential mechanism 5 has a portion that overlaps the motor 2 when viewed in the rotation axis X direction.

The oil cooler 83 has a portion that overlaps the housing HS when viewed in the rotation axis X direction.

The oil cooler 83 is positioned above the differential mechanism 5 in the vertical line VL direction.

Disposing the oil cooler 83 at a position overlapping the inclined portion 141*c* of the gear case 14 when viewed in the rotation axis X direction contributes to a reduction in dimension of the unit 1 in at least the radial direction.

In the unit 1 in which the motor 2 and the differential mechanism 5 are coaxial with each other, the layout on an upper side in a vehicle height direction is less constrained than on a lower side in the vehicle height direction. Therefore, the surface area of the oil cooler 83 can be increased by disposing the oil cooler 83 upward in the vehicle height direction. Since the heat exchange rate of the oil cooler 83 increases as the surface area increases, the oil OL can be efficiently cooled.

(6) When viewed in the rotation axis X direction, the oil cooler 83 has a shape including an arc-shaped portion disposed to surround the rotation axis X which is an axis of the drive shaft DB which is an output shaft of the differential mechanism 5.

The oil cooler 83 includes the main body portion 830 which is an arc-shaped portion. By forming the oil cooler 83 in an annular shape surrounding the drive shaft DB, the oil cooler 83 can be disposed along the shape of the unit 1, which contributes to a reduction in dimension of the unit 1.

In the embodiment, although the main body portion 830 of the oil cooler 83 includes the first wall portion 831 along the inclined portion 141*c* of the gear case 14, the present invention is not limited thereto. The first wall portion 81 of the oil cooler 83 may be removed, and the second wall portion 832, the third wall portion 833, and the fourth wall portion 834 may be directly joined to the inclined portion 141*c*. As a result, a space surrounded by the second wall portion 832, the third wall portion 833, the fourth wall portion 834, and the inclined portion 141*c* becomes the internal space Sd. As in the embodiment, flow paths through which the cooling water CL and the oil OL flow may be provided in the internal space Sd.

In an aspect of the present invention, the power transmission mechanism 3 includes, for example, a gear mechanism and an annular mechanism.

The gear mechanism includes, for example, a reduction gear mechanism, an acceleration gear mechanism, and a differential gear mechanism (differential mechanism).

The reduction gear mechanism and the acceleration gear mechanism include, for example, a planetary gear mechanism and a parallel gear mechanism.

The annular mechanism includes, for example, an endless annular component.

The endless annular component includes, for example, a chain sprocket, a belt, and a pulley.

The differential mechanism 5 is, for example, a bevel gear type differential gear, a planetary gear type differential gear.

The differential mechanism 5 includes a differential case as an input element, two output shafts as output elements, and a differential gear set as a differential element.

In the bevel gear type differential gear, the differential gear set includes bevel gears.

In the planetary gear type differential gear, the differential gear set includes planetary gears.

The unit 1 includes a gear that rotates integrally with the differential case.

For example, a final gear (differential ring gear) of the parallel gear mechanism rotates integrally with the differential case. For example, when a carrier of the planetary gear mechanism is connected to the differential case, a pinion gear rotates (revolves) integrally with the differential case.

For example, a reduction gear mechanism is connected downstream of the motor 2. A differential gear mechanism is connected downstream of the reduction gear mechanism. That is, a differential gear mechanism is connected downstream of the motor 2 via a reduction gear mechanism. An acceleration gear mechanism may be used instead of the reduction gear mechanism.

A single-pinion type planetary gear mechanism can use, for example, a sun gear as an input element, a ring gear as a fixed element, and a carrier as an output element.

A double-pinion type planetary gear mechanism can include, for example, a sun gear as an input element, a ring gear as an output element, and a carrier as a fixed element.

As a pinion gear of the single-pinion type planetary gear mechanism or the double-pinion type planetary gear mechanism, for example, a stepped pinion gear or a non-stepped pinion gear can be used.

The stepped pinion gear includes a large pinion and a small pinion. For example, it is preferable to mesh the large pinion with the sun gear. For example, it is preferable to fit the small pinion into the ring gear.

The non-stepped pinion gear is a type that is not a stepped pinion gear.

In the present embodiment, although an example in which the unit 1 according to an aspect of the present invention is mounted on a vehicle has been described, the present invention is not limited to this aspect. The present invention can be applied to other than vehicles. When a plurality of examples and modifications are described in the present embodiment, these examples and modifications may be freely combined.

Although the embodiment of the present invention has been described above, the above embodiment is merely an application example of the present invention and is not intended to limit the technical scope of the present invention to the specific configuration of the above embodiment. The embodiment can be changed as appropriate within the scope of the technical idea of the invention.

The present application claims a priority of Japanese Patent Application No. 2021-105240 filed with the Japan Patent Office on Jun. 24, 2021, all the contents of which are hereby incorporated by reference.

DESCRIPTION OF REFERENCE SIGNS

1 unit
2 motor
5 differential mechanism (differential gear mechanism)
14 gear case
141*c* inclined portion (inclined surface)
83 oil cooler (heat exchanger)
830 main body portion (arc-shaped portion)
HS housing
DA, DB drive shaft (output shaft)
X rotation axis (axis)

The invention claimed is:

1. A unit comprising:
a motor;
a housing configured to accommodate a differential gear mechanism, the differential gear mechanism being connected downstream of the motor; and
a heat exchanger positioned outside the housing, wherein the housing has a portion having an inclined surface surrounding the differential gear mechanism in a radial direction,
the heat exchanger has a portion that overlaps the inclined surface when viewed in an axial direction,
the inclined surface has a portion positioned between the differential gear mechanism and the heat exchanger, and
the heat exchanger does not overlap the motor when viewed in the radial direction.

2. The unit according to claim 1, wherein
the heat exchanger has a portion that overlaps the inclined surface when viewed in the radial direction.

3. The unit according to claim 2, wherein
the differential gear mechanism has a portion that overlaps the motor when viewed in the axial direction, and
the heat exchanger has a portion that is positioned above a horizontal plane passing through an axis of an output shaft of the differential gear mechanism and orthogonal to a gravity direction.

4. The unit according to claim 1, wherein
the differential gear mechanism has a portion that overlaps the motor when viewed in the axial direction, and
the heat exchanger has a portion that is positioned above a horizontal plane passing through an axis of an output shaft of the differential gear mechanism and orthogonal to a gravity direction.

5. The unit according to claim 1, wherein
the heat exchanger has a shape including an arc-shaped portion disposed to surround an axis of an output shaft of the differential gear mechanism when viewed in the axial direction.

6. A unit comprising:
a housing configured to accommodate a differential gear mechanism including a differential case and a differential gear set in the differential case; and
a heat exchanger positioned outside the housing, wherein
the differential gear mechanism has a portion that overlaps a motor when viewed in an axial direction,
the heat exchanger has a portion that overlaps the housing when viewed in the axial direction, and
the heat exchanger is positioned above the differential case in a gravity direction.

7. The unit according to claim 6, wherein
the heat exchanger has a shape including an arc-shaped portion disposed to surround an axis of an output shaft of the differential gear mechanism when viewed in the axial direction.

* * * * *